(12) United States Patent
Guzik et al.

(10) Patent No.: US 11,977,993 B2
(45) Date of Patent: May 7, 2024

(54) DATA SOURCE CORRELATION TECHNIQUES FOR MACHINE LEARNING AND CONVOLUTIONAL NEURAL MODELS

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, Taipei (TW); WHP Workflow Solutions, Inc., North Charleston, SC (US)

( * ) Notice: Subject to any disclaimer, the term of this patent is extended or adjusted under 35 U.S.C. 154(b) by 658 days.

(21) Appl. No.: 17/107,865

(22) Filed: Nov. 30, 2020

(65) Prior Publication Data
US 2022/0172087 A1 Jun. 2, 2022

(51) Int. Cl.
*G06N 7/01* (2023.01)
*G06N 20/00* (2019.01)

(52) U.S. Cl.
CPC .............. *G06N 7/01* (2023.01); *G06N 20/00* (2019.01)

(58) Field of Classification Search
CPC ........ G06N 20/00; G06N 20/10; G06N 20/20; G06N 7/01; G06N 7/04; G06N 7/00
See application file for complete search history.

(56) References Cited

U.S. PATENT DOCUMENTS

| 6,760,744 B1 | 7/2004 | Halaas et al. |
| 7,917,888 B2 | 3/2011 | Chong et al. |
| 8,452,722 B2 | 5/2013 | Naeve et al. |

(Continued)

FOREIGN PATENT DOCUMENTS

| CN | 109671266 B | 11/2020 |
| JP | 2008204219 A | 9/2008 |

(Continued)

OTHER PUBLICATIONS

Mousavi et al. "A new ensemble learning methodology based on hybridization of classifier ensemble selection approaches" Dec. 2015 https://www.sciencedirect.com/science/article/pii/S1568494615005797 (Year: 2015).*

(Continued)

*Primary Examiner* — Alan Chen
(74) *Attorney, Agent, or Firm* — Finnegan, Henderson, Farabow, Garrett & Dunner, L.L.P.

(57) ABSTRACT

A data model computing device receives a first data model with a first set of attributes, a first margin of error, a first set of predictions, and an underlying data set. Subsequently, the data model computing device receives a second data model with a second set of attributes, as the test data for a machine learning module. Based on the first and second data model, the machine learning function generates a second set of predictions and a second margin of error. The data model computing device performs a statistical analysis on the first and second set of predictions and the first and second margin of error to determine if the second set of predictions converge with the first set of predictions and second margin of error is narrower than the first margin of error, to determine if the second data model improves the prediction results of the machine learning module.

20 Claims, 4 Drawing Sheets

(56) References Cited

U.S. PATENT DOCUMENTS

| | | |
|---|---|---|
| 8,606,844 B2 | 12/2013 | Kaufman et al. |
| 8,688,320 B2 | 4/2014 | Faenger |
| 9,110,774 B1 | 8/2015 | Bonn et al. |
| 9,264,678 B2 | 2/2016 | Nuyttens et al. |
| 9,449,229 B1 | 9/2016 | Laska et al. |
| 9,483,732 B1 | 11/2016 | Milakovich |
| 9,485,474 B2 | 11/2016 | Kim et al. |
| 9,681,104 B2 | 6/2017 | Billau et al. |
| 9,723,251 B2 | 8/2017 | Slotky |
| 9,738,125 B1 | 8/2017 | Brickley et al. |
| 9,755,890 B2 | 9/2017 | Robertson et al. |
| 9,832,205 B2 | 11/2017 | Santhi et al. |
| 9,848,312 B2 | 12/2017 | Sundel et al. |
| 9,852,132 B2 | 12/2017 | Chhichhia et al. |
| 9,886,261 B1 | 2/2018 | Hotchkies |
| 10,324,773 B2 | 6/2019 | Wing et al. |
| 10,460,014 B2 | 10/2019 | Lloyd et al. |
| 10,540,883 B1 | 1/2020 | Keil et al. |
| 10,902,955 B1 | 1/2021 | Federoff et al. |
| 11,238,290 B2 | 2/2022 | Burns et al. |
| 11,605,288 B2 | 3/2023 | Guzik |
| 2003/0081127 A1 | 5/2003 | Kirmuss |
| 2003/0095688 A1 | 5/2003 | Kirmuss |
| 2003/0163512 A1 | 8/2003 | Mikamo |
| 2003/0208679 A1 | 11/2003 | Vazquez |
| 2006/0257001 A1 | 11/2006 | Veen et al. |
| 2008/0147267 A1 | 6/2008 | Plante et al. |
| 2008/0303903 A1 | 12/2008 | Bentley et al. |
| 2009/0150017 A1 | 6/2009 | Caminiti et al. |
| 2009/0210455 A1 | 8/2009 | Sarkar et al. |
| 2009/0248711 A1 | 10/2009 | Martinez et al. |
| 2009/0284359 A1 | 11/2009 | Huang et al. |
| 2010/0036560 A1 | 2/2010 | Wright et al. |
| 2010/0144318 A1 | 6/2010 | Cable |
| 2011/0205068 A1 | 8/2011 | Huynh et al. |
| 2011/0302151 A1 | 12/2011 | Abadi et al. |
| 2012/0084747 A1 | 4/2012 | Chakradhar et al. |
| 2013/0039542 A1 | 2/2013 | Guzik |
| 2013/0344856 A1 | 12/2013 | Silver et al. |
| 2013/0347005 A1 | 12/2013 | Lam et al. |
| 2014/0343796 A1 | 11/2014 | Abuelsaad et al. |
| 2015/0089019 A1 | 3/2015 | Chou |
| 2015/0341370 A1 | 11/2015 | Khan |
| 2016/0042767 A1 | 2/2016 | Araya et al. |
| 2016/0086397 A1 | 3/2016 | Phillips |
| 2016/0153801 A1 | 6/2016 | Cho et al. |
| 2016/0190859 A1 | 6/2016 | Blum et al. |
| 2016/0248856 A1 | 8/2016 | Kao |
| 2016/0342447 A1 | 11/2016 | Richter et al. |
| 2016/0371553 A1 | 12/2016 | Farnham, IV et al. |
| 2016/0378607 A1 | 12/2016 | Kumar et al. |
| 2017/0011324 A1 | 1/2017 | Truong et al. |
| 2017/0048482 A1 | 2/2017 | Drako et al. |
| 2017/0148027 A1 | 5/2017 | Yu et al. |
| 2017/0161323 A1 | 6/2017 | Simitsis et al. |
| 2017/0161409 A1 | 6/2017 | Martin |
| 2017/0164062 A1 | 6/2017 | Abramov et al. |
| 2017/0339021 A1 | 11/2017 | Dukatz |
| 2018/0079413 A1 | 3/2018 | Herrero et al. |
| 2018/0145923 A1 | 5/2018 | Chen et al. |
| 2018/0285759 A1 | 10/2018 | Wood et al. |
| 2018/0365909 A1 | 12/2018 | Cheng et al. |
| 2019/0019122 A1 | 1/2019 | Allen |
| 2019/0026665 A1 | 1/2019 | Caskey et al. |
| 2019/0043351 A1 | 2/2019 | Yang et al. |
| 2019/0054925 A1 | 2/2019 | Froeschl et al. |
| 2019/0095805 A1* | 3/2019 | Tristan ................ G06N 5/045 |
| 2019/0140886 A1 | 5/2019 | Zywicki et al. |
| 2019/0325354 A1 | 10/2019 | Rajnayak et al. |
| 2020/0007827 A1 | 1/2020 | Saad et al. |
| 2020/0072637 A1 | 3/2020 | Guidotti et al. |
| 2020/0074156 A1 | 3/2020 | Janumpally et al. |
| 2020/0081899 A1 | 3/2020 | Shapur et al. |
| 2020/0145620 A1 | 5/2020 | Alcantara et al. |
| 2020/0151360 A1 | 5/2020 | Zavesky et al. |
| 2020/0172112 A1 | 6/2020 | Kawashima |
| 2020/0211216 A1 | 7/2020 | Hagio et al. |
| 2020/0304854 A1 | 9/2020 | Baumgartner et al. |
| 2020/0312046 A1 | 10/2020 | Righi et al. |
| 2020/0351381 A1 | 11/2020 | Lacey et al. |
| 2020/0387833 A1* | 12/2020 | Kursun ................ G06F 21/562 |
| 2021/0076002 A1 | 3/2021 | Peters et al. |
| 2021/0089374 A1 | 3/2021 | Watson et al. |
| 2021/0133808 A1 | 5/2021 | Chan et al. |
| 2021/0136277 A1 | 5/2021 | McFarlane |
| 2021/0272702 A1 | 9/2021 | Hakami |
| 2021/0297929 A1 | 9/2021 | Frusina et al. |
| 2021/0377205 A1 | 12/2021 | Brown et al. |
| 2022/0014907 A1 | 1/2022 | Boyd et al. |
| 2022/0169258 A1 | 6/2022 | Samarthyam et al. |
| 2022/0172604 A1 | 6/2022 | Guzik |
| 2022/0291752 A1 | 9/2022 | Agu |
| 2023/0206749 A1 | 6/2023 | Guzik |

FOREIGN PATENT DOCUMENTS

| | | |
|---|---|---|
| KR | 20130010400 A | 1/2013 |
| KR | 20190086134 A | 7/2019 |
| WO | 2010056891 A1 | 5/2010 |

OTHER PUBLICATIONS

Li et al. "Exploration of classification confidence in ensemble learning" Sep. 2014 https://www.sciencedirect.com/science/article/pii/S0031320314001198 (Year: 2014).*

U.S. Appl. No. 17/107,708, Final Office Action dated Aug. 19, 2022, 52 pages.

U.S. Appl. No. 17/107,714. Office Action dated Aug. 18, 2022, 66 pages.

U.S. Appl. No. 17/107,785, Notice of Allowance dated Nov. 10, 2022, 26 pages.

U.S. Appl. No. 17/107,830, Notice of Allowance dated Nov. 9, 2022, 22 pages.

U.S. Appl. No. 17/107,877, Notice of Allowance dated Aug. 22, 2022, 40 pages.

U.S. Appl. No. 17/590,738, Notice of Allowance dated Oct. 5, 2022, 48 pages.

U.S. Appl. No. 17/107,764, Notice of Allowance dated May 26, 2022, 26 pages.

U.S. Appl. No. 17/107,785, Office Action dated Jul. 7, 2022, 21 pages.

U.S. Appl. No. 17/107,824, Notice of Allowance dated Jun. 7, 2022, 33 pages.

U.S. Appl. No. 17/107,830, Office Action dated Jun. 7, 2022, 51 pages.

International Patent Application No. PCT/US2021/060890, International Search Report and Written Opinion dated Mar. 21, 2022, 11 pages.

International Patent Application No. PCT/US2021/060892, International Search Report and Written Opinion dated Mar. 21, 2022, 10 pages.

International Patent Application No. PCT/US2021/060893, International Search Report and Written Opinion dated Mar. 21, 2022, 9 pages.

International Patent Application No. PCT/US2021/060894, International Search Report and Written Opinion dated Mar. 21, 2022, 9 pages.

International Patent Application No. PCT/US2021/060895, International Search Report and Written Opinion dated Mar. 21, 9 pages.

International Patent Application No. PCT/US2021/060896, International Search Report and Written Opinion dated Mar. 14, 2022, 11 pages.

Juan Rendon et al. Structural combination of neural network models. 2016 IEEE 16th International Conference on Data Mining Workshops (ICDMW). IEEE. Dec. 12, 2016, pp. 406-413. Section II; and figure 2.

Massimo Bonavita et al. Machine Learning for Model Error Inference and Correction. Journal of Advances in Modeling Earth Systems. Nov. 13, 2020, pp. 1-22. Section 2.1; and figure 1.

(56) References Cited

OTHER PUBLICATIONS

MD Manjurul Ahsan et al. Deep MLP-CNN Model Using Mixed-Data to Distinguish between COVID-19 and Non-COVID-19 Patients. Symmetry 2020. Sep. 16, 2020, pp. 1-14. Section 2; and figure 3.

U.S. Appl. No. 17/107,708, Office Action dated May 9, 2022, 57 pages.

U.S. Appl. No. 17/107,764, Office Action dated Dec. 8, 2021, 38 pages.

U.S. Appl. No. 17/107,785, Final Office Action dated May 11, 2022, 9 pages.

U.S. Appl. No. 17/107,785, Office Action dated Mar. 29, 2022, 30 pages.

U.S. Appl. No. 17/107,824, Notice of Allowance dated May 2, 2022, 34 pages.

U.S. Appl. No. 17/107,824, Office Action dated Dec. 29, 2021, 30 pages.

U.S. Appl. No. 17/107,877, Final Office Action dated Dec. 29, 2021, 40 pages.

U.S. Appl. No. 17/107,891, Notice of Allowance dated Nov. 2, 2021, 23 pages.

Van Hiep Phung et al. A High-Accuracy Model Average Ensemble of Convolutional Neural Networks for Classification of Cloud Image Patches on Small Datasets. Applied Sciences 2019. Oct. 23, 2019, pp. 1-16. Section 2; and figure 3.

Xueheng Qiu et al. Ensemble Deep Learning for Regression and Time Series Forecasting. 2014 IEEE Symposium on Computational Intelligence in Ensemble Learning (CIEL). IEEE, Dec. 9, 2014, pp. 1-6.

U.S. Appl. No. 17/107,877, Office Action dated Aug. 18, 2021, 40 pages.

U.S. Appl. No. 17/107,891, Final Office Action dated Aug. 5, 2021, 21 pages.

U.S. Appl. No. 17/107,891, Office Action dated Apr. 1, 2021, 22 pages.

U.S. Appl. No. 17/107,708, Notice of Allowance dated Mar. 29, 2023, 26 pages.

U.S. Appl. No. 17/107,708, Office Action dated Dec. 8, 2022, 44 pages.

U.S. Appl. No. 17/107,714. Notice of Allowance dated Dec. 15, 2022, 31 pages.

U.S. Appl. No. 17/863,107, Office Action dated Mar. 23, 2023, 32 pages.

U.S. Appl. No. 18/117,698, Office Action dated Oct. 3, 2023, 32 pages.

U.S. Appl. No. 18/117,936, Notice of Allowance dated Sep. 20, 2023, 21 pages.

U.S. Appl. No. 18/117,936, Office Action dated Jul. 19, 2023, 30 pages.

Wang et al., Supporting Very Large Models using Automatic Dataflow Graph Partitioning, 2019 (Year: 2019).

* cited by examiner

DATA SOURCE CORRELATION TECHNIQUES FOR MACHINE LEARNING AND CONVOLUTIONAL NEURAL MODELS

BACKGROUND

Machine learning, a subset of artificial intelligence, is an area of computational science in which, through the use of algorithms, data is analyzed and interpreted to reason and predict outcomes without specific instructions. By the way of algorithms, a computer may be trained to analyze data, and based on the results, perform specific duties and improve algorithms without human interaction. For the computer to use the algorithms effectively and come to an expected result, the machine learning element may be required to be provided with training data. The training data may be live data or a set of expected results that guide the algorithms in developing its predictive abilities; however, the quality of the training data may have an effect on the expected result In some cases, based on data entered into the machine learning element, such as the training data, the prediction of the algorithm may lead to a result that converges with expectation or reflects real outcomes. In alternate scenarios, the training data may lead the machine learning algorithm to predict results that diverge from an expected result or that do not reflect a real outcome. In these scenarios, the predictions are inaccurate and/or the algorithms ability to process the input data is inefficient or ineffective. As a result, a machine learning algorithm's effectiveness to predict accurate outcomes is dependent on the quality of the input or training data. There is a need for a method of vetting the attributes of the input/training data to establish the effectiveness of the information in producing a result that is compatible with expected results and real outcomes.

BRIEF DESCRIPTION OF THE DRAWINGS

The detailed description is depicted with reference to the accompanying figures, in which the left most digit(s) of a reference number identifies the figure in which the reference number first appears. The use of the same reference numbers in different figures indicates similar or identical items.

DETAILED DESCRIPTION

Figure 1:
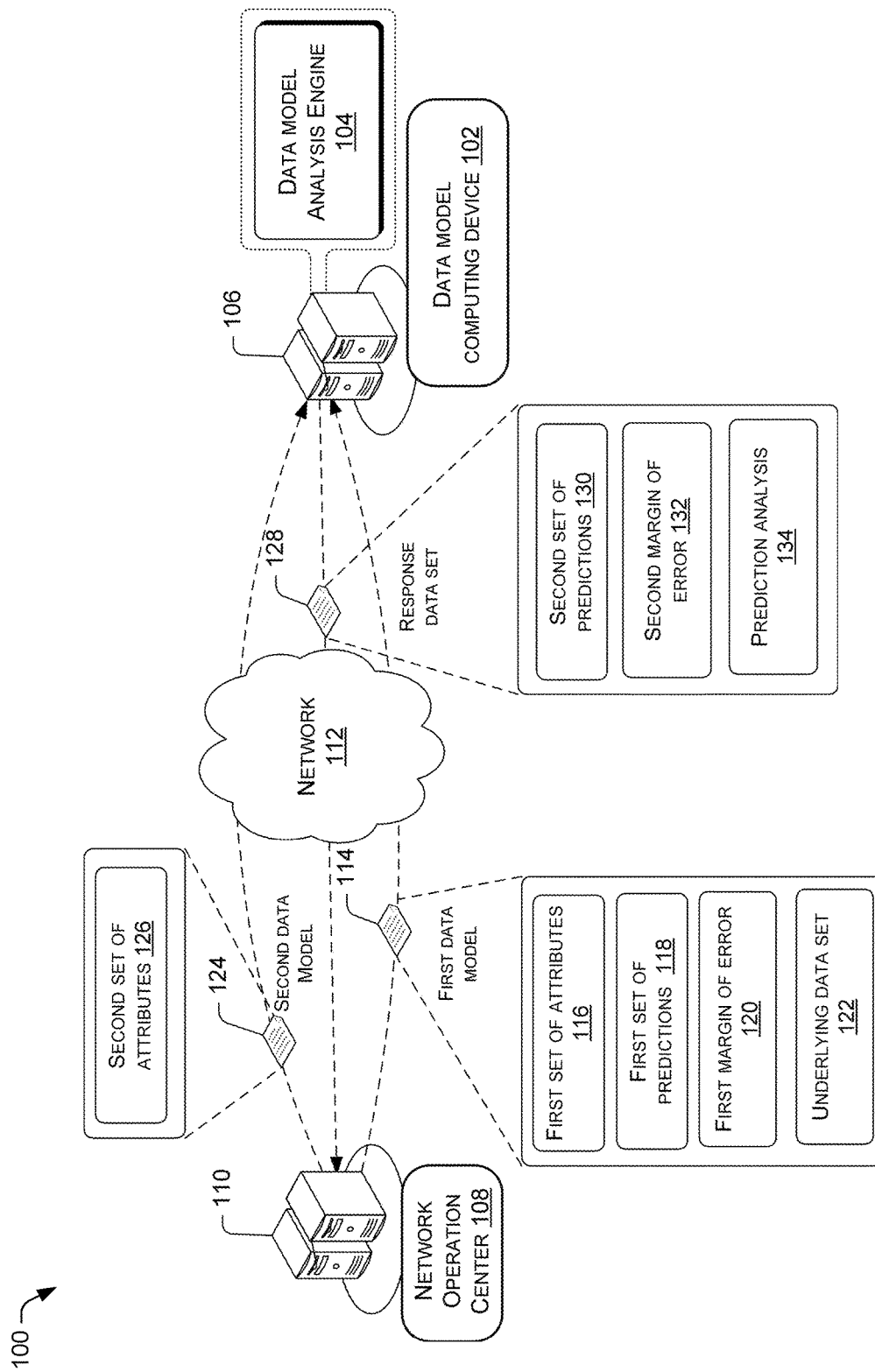
FIG. 1 illustrates an example architecture for implementing the data source correlation techniques for machine learning and convolutional neural models.

This disclosure is directed to techniques for a method of improving the quality attributes of input data that is used in the analytical processing of a machine learning element to develop more accurate predictions. The typical input data, such as training data for machine learning elements, may contain attributes that are associated with or included in an underlying data set, along with expected predictions and an associated margin of error. The margin of error is a determination of how reliable the expected prediction is. Margin of error can be a percentage of uncertainty that the expected prediction will not be the outcome of the machine learning element.

The prediction of the machine learning element is shaped by the quality of the attributes that are used as inputs for the algorithm. Some attributes may lead the algorithm to predict a result that is accurate with respect to a real outcome, while other attributes may lead to a calculation that includes errors or may lead to predictions that are not compatible with real outcomes.

The proposed disclosure provides for the test of attributes, or a first data model, that are part of an underlying data set and are used as input or training data for machine learning elements. The training data includes a first set of attributes that are associated with the underlying data set, a first expected set of predictions, and an associates first margin of error for the first expected set of predictions. The training data may include live data or real outcomes or predictions that are associated with the first set of attributes. In example embodiments, the first expected set of predictions can take the form of a series of probabilities, a binomial distribution of values, and/or any other arrangement a set of predictions are organized in.

Subsequently, a new model attribute, for example a second set of attributes that are to be tested, is added to the training data, forming a second data model. The test attribute is the element that is being tested to determine its effectiveness to improve the predictability of the machine learning element. Using the second set of attributes, the algorithms of the machine learning process may produce a second set of predictions, and a second set of margins of error.

Subsequently, a statistical analysis may be applied to the first expected set of predictions, the first margin of error, the second set of predictions, and the second margin of error. The statistical analysis may be in the form of the Bayes theorem or another form of statistical analysis used to determine the conditional probability of events. The effect of the statistical analysis is to determine whether the second set of predictions converges to the first set of predictions, while the second margin of error is narrower than the first margin of error.

In accordance with example embodiments, if the inclusion of the new model attribute into the underlying data results in a more accurate prediction, for example the second margin of error is less than the first margin of error, then the new model attribute is merged with the first set of attributes for the machine learning element to produce predictions that have an improved quality with respect to the first expected set of results.

Illustrative System Architecture

FIG. 1 is a schematic diagram of an illustrative computing environment 100 for using a data model computing device to improve the prediction accuracy of a machine learning engine by testing new data attributes and performing a statistical analysis on the predicted results to establish an improvement in quality of the predicted results. The quality of the predicted results may be defined by the convergence of the prediction that includes the new data attributes while the margin of error is reduced. The computing environment shows a data model computing device 102, with a data model analysis engine 104, that is communicatively connected to a Network Operation Center (NOC) 108, via a network 112. In additional embodiments, the NOC 108 may be a server or a computing device that routes data models to be analyzed by the data model computing device 102. For the purposes of illustration, FIG. 1 illustrates one NOC 108, one first data model 114 and one second data model 124; however, the system 100 can be support or can be scaled to support multiple NOCs, computing devices and data models. In example embodiments, the system 100 may process simultaneously data models and attributes from multiple NOCs or computing devices to improve the prediction of multiple machine learning models.

The servers 106, of the data model computing device 102, may interact with a computing device, such as NOC 108 via a network 112. The network 112 may include one or more local area network (LAN), a larger network such as a wide area network (WAN), a mobile telephone network, and/or a collection of networks, or the Internet. The network may be a wired network, a wireless network, or both. In additional embodiments, the data model computing device 102 may be communicatively connected to multiple computing devices and multiple networks for the processing of data models for multiple machine learning models.

Data models, such as first data model 114, may be formatted and organized in columnar data files, in tabulated text files, in nested files, hierarchical data forms, and/or array-based formats. In columnar data files, the data may be stored in row oriented or column-oriented formats. Tabular text data contains text-based data that is separated by commas, semicolons, or another delimiter that separates strings of text data. Nestled file format store records in a hierarchical format with one or multiple parents and children. Nestled file formats are able to be extended, while maintaining an order and a backward compatibility to the data. Array based format data files contain data in arrays of columnar and row-oriented data structures. Hierarchical data forms maintain data in a tree-like structure with data connected to one another through links.

The data contained within the data models may be text, video or audio data files. The video data files may be formatted as an Advanced Video Coding High Definition (AVCHD), Moving Pictures Experts Group (MPEG), Movie Digital Video (MOV), Windows Media Window (WMV), or an Audio Video Interleave (AVI) file, or any other file data format used to contain graphic and acoustic data. The audio files may be in a format that include Waveform Audio File Format (WAVE), Audio Interchange File Format (AIFF), Broadcast Wave Format (BWF), or any other file format that contains acoustic data.

The data models may hold attributes, predictions, margins of error, and underlying data sets. The attribute may be a characteristic inherent to an object or an action that identifies that object or action or assigns a quality to the object or action. The underlying data set may be comprised of all the data, including a multitude of attributes that form a totality of information, that is to be analyzed by the machine learning element. The predictions may be estimated outcomes from the machine learning environment, that are based on the attributes and the underlying data set. The predictions may be in the form of a series of probabilities, a binomial distribution of values, or in any other form a set of predictions may be organized in. The margins of error may be percentages of uncertainty for the predictions.

The NOC 108 may initiate a communication session with the data model computing device 102 for a machine learning prediction and statistical analysis for the prediction, that is based on a data model, such as first data model 114. The NOC 108 may route the first data model 114 to the data model computing device 102 via the network 112. The first data model 114 may contain a first set of attributes 116, a first set of predictions 118, and an associated margin of error 120 for the first set of predictions, and the underlying data set 122.

In some embodiments, the first set of attributes 114 are a subset and part of the underlying data set 122. In these cases, the first set of attributes 116 and the underlying data 122 may be part of the input for the machine learning element, but the first set of attributes 114 may have a higher order of importance for the machine learning algorithm than the underlying data set 122. The first set of predictions 118 may be the forecasted results of the machine learning element, while in additional embodiments the first set of predictions 118 are live data or expected set of predictions. The first set of predictions 118 may be provided by a user, another computing device, or any other system or method that produces training data for machine learning elements. The margin of error 120 for the first set of predictions 118 is a determination of the reliability or outcome uncertainty for the first set of results 118.

Furthermore, the NOC 108 may route a second data model 124 to the data model computing device 102, via the network 112. The second data model 124 may contain a second set of attributes 126, which is the test attributes for improving the ability of the machine learning element to produce predictions that have lower margins of errors.

Subsequently, the data model analysis engine 104, of the data model computing device 102, may combine the first set of attributes 116 and the second set of attributes 126. Using the first set of attributes 116 and the second set of attributes 126 and the underlying data 122, the data model analysis engine 104 may process the data, via an algorithm, to compute a second set of predictions 130 and a second margin of error 132 for the second set of predictions.

The data model analysis engine 104 may then perform a statistical analysis on the first set of predictions 118 with the corresponding first margin of error 120 and the second set of predictions 130 with the corresponding second margin of error 132. The statistical analysis may establish if the inclusion of the second set of attributes 126 in the machine learning element improves the ability of the algorithm to develop predictions that are closer to expected results and with a second margin of error that is lower than a first margin of error. The prediction analysis 134 may contain the result of the statistical analysis for the two predictions and their respective margin of errors. If based on the statistical analysis, the inclusion of the second set of attributes 126 results in the second margin of error 132 being less than the first margin of error 120, then the second set of attributes is established to be a quality set of attributes. A quality set of attributes is a set of attributes that result in the machine learning element providing predictions that are within an expected threshold of real outcomes.

The data model computing device 102 may route a response data set 128 to the NOC 108, which contains the second set of results 130, the second margin of error 132, and the prediction analysis 134. The NOC 108 may use the response data set 128 to segregate quality sets of attributes from other test attributes. These quality sets of attributes provide predictions that converge, or approach a limit of a real or expected outcome, or a first set of predictions, and have a lower margin of error when compared to the margin of error of the machine learning element prediction without the test attribute.

Example Server Components

Figure 2:
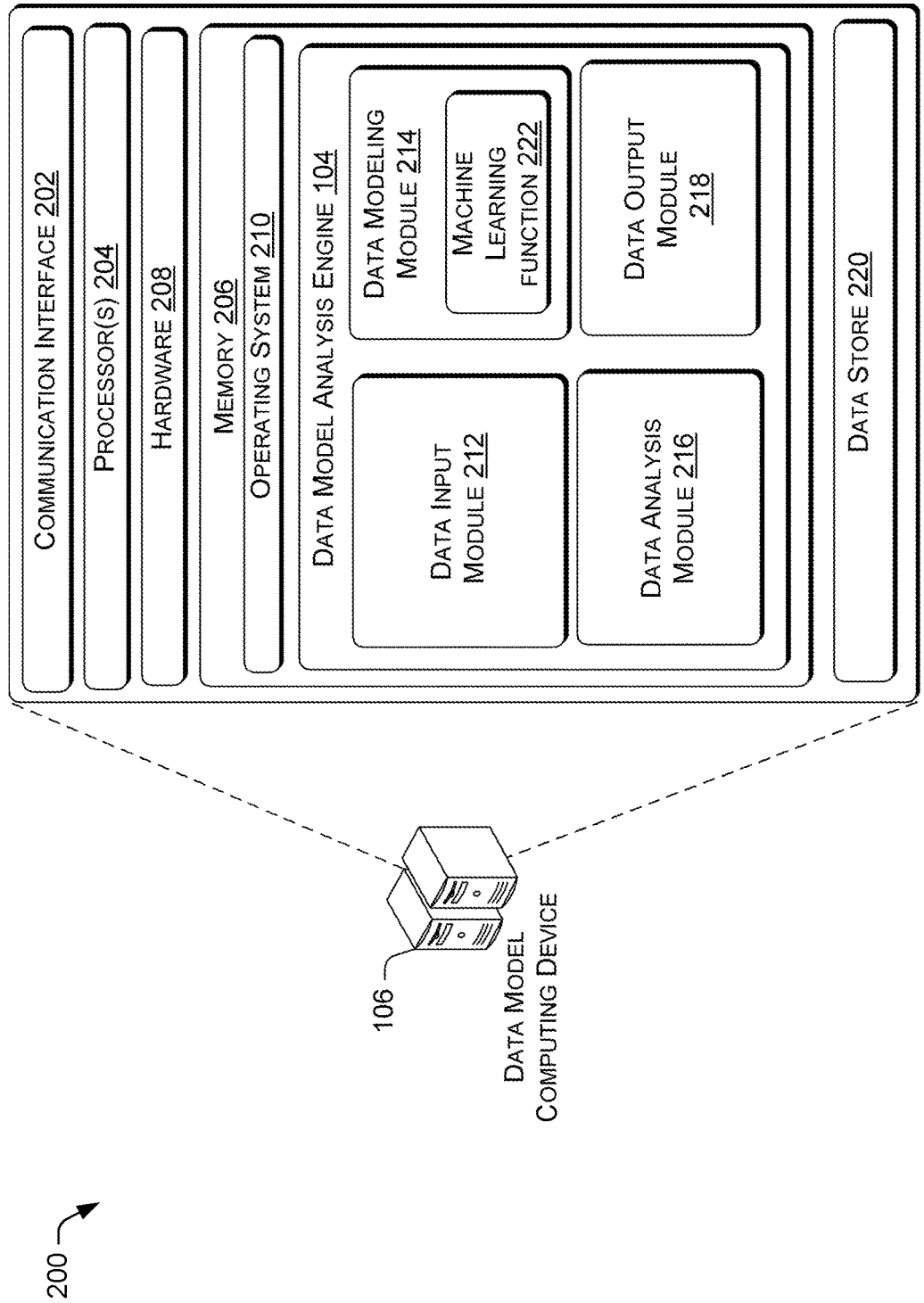
FIG. 2 is a block diagram showing various components of an example computing device that implements the data source correlation techniques for machine learning and convolutional neural models.

FIG. 2 is a block diagram showing various components of the data model computing device 102 that implements the data model analysis engine 104. The data model analysis engine 104 may be implemented on one or more computing devices 106 that are part of the data model computing device 102. The computing devices 106 may include general purpose computers, such as desktop computers, tablet computers, laptop computers, servers, or other electronic devices that are capable of receive inputs, process the inputs, and generate output data. In other embodiments, the computing devices 106 may be virtual computing devices in the form of virtual machines or software containers that are hosted in a cloud. The computing devices 106 may be equipped with a communication interface 202, one or more processors 204, memory 206, and device hardware 208. The communication interface 202 may include wireless and/or wired communication components that enable the computing devices to transmit data to and receive data from other networked devices via a communication network. The device hardware 208 may include additional hardware that performs user interface, data display, data communication, data storage, and/or other server functions.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, Random-Access Memory (RAM), Dynamic Random-Access Memory (DRAM), Read-Only Memory (ROM), Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanism.

The processors 204 and the memory 206 of the computing devices 106 may implement an operating system 210 and the data model analysis engine 104. The operating system 210 may include components that enable the computing devices 106 to receive and transmit data via various interfaces (e.g., user controls, communication interface, and/or memory input/output devices), as well as process data using the processors 204 to generate output. The operating system 210 may include a display component that presents the output (e.g., display the data on an electronic display, store the data in memory, transmit the data to another electronic device, etc.). Additionally, the operating system 210 may include other components that perform various additional functions generally associated with an operating system.

The data model analysis engine 104 may include a data input module 212, a data modeling module 214, a data analysis module 216, and a data output module 218. The sentiment analysis engine 104 may also interact with a data store 220. These modules may include routines, program instructions, objects, and/or data structures that perform particular tasks or implement particular abstract data types.

The data input module 212 may receive a first data model 116 and a second data model 124, via the network 112. The first data model 116 may include a first set of attributes 118, a first set of predictions 118, a first margin of error 120, and the underlying data set 122. The second data model 124 may include a second set of attributes 126 that is the test set of attributes for the machine learning algorithm predictability improvement test.

The set of test attributes may be characteristics inherent to an object or an action that identifies that object or action or assigns a quality to the object or action. The underlying data set 122 may comprise all the data collected for analysis, including a multitude of attributes that forms the totality of information that is to be processed by the machine learning algorithm. The machine learning algorithm outcomes are estimated predictions that are based on the input attributes and the underlying data set. The predicted results may be in the form of a series of probabilities, a binomial distribution of values, or in any other form a set of predictions may be organized in. In example embodiments, the margin of error is a percentage of uncertainty for the machine learning algorithm predictions.

The data modeling module 214 may use the first data model 114 and the second data model 124 to test the probability distribution for all the attributes in the data models. In additional embodiments the data modeling module 214 may aggregate the first set of attributes 118 and the second set of attributes 126 and input the combined data into a machine learning function 222.

The machine learning function 222 may use machine learning algorithms to generate a second set of predictions 130 and an associated second margin of error 132. Various classification schemes (explicitly and/or implicitly trained) and/or systems may be employed by the machine learning function 216 for the generation of a second set of results and associated margin of error, such as a probabilistic and/or a statistical based analysis. A classifier is a function that maps an input attribute vector, $x=(x1, x2, x3, x4, xn)$ to a confidence that the input belongs to a class, that is, $F(x)$=confidence (class). Such classification may employ a probabilistic and/or statistical based analysis to generate an attribute model. A support vector machine is an example of a classifier that may be employed by the machine learning function 222. Other directed and undirected model classification approaches include, e.g., naïve Bayes, Bayesian networks, decision trees, neural networks, fuzzy logic models, and probabilistic classification models providing different patterns of independence may also be employed.

The training data that is used by the machine learning function 222 to generate the second set of results 130 may include the first set of attributes 116, the first set of predictions 118, the first margin of error 120, and the underlying data set 122. The training data may further include previously calculated or observed results derived from live data or known outcomes. The use of previously observed and/or calculated data may reduce model generation complexity and/or decrease the generation time of the second set of predictions 130.

In various embodiments, the machine learning function 222 may predict a second set of predictions, or a vector of a second set of results, for a given set of attributes. In other words, given an attribute, an attribute model function CM $(x, y, z)$ may provide a resulting value RS, or a set of resulting values $R(RS1, RS2, \ldots, RSN)$. The values in the set values R are not necessarily order-dependent. The attribute function CM theoretically provides resulting values for every attribute for the domain of the function. The domain of the function is bound between the constraints of two opposing extremes.

The training data may be supplemented with data extrapolated from other attributes and/or underlying data. Specifically, the machine learning function 222 may obtain data, extrapolate such data, and cluster the data based on attributes and underlying data that constrain or affect the attributes. As such, the machine learning function 222 may extrapolate and update the second set of predictions. In practice, as real-world measured results are collected, the machine learning function 222 may preferentially use real-world data over training data. Accordingly, the use of training data by the machine learning function 222 may be phased out or updated as historical data is collected.

The machine learning function 222 may establish a second set of predictions 130 and a second margin of error 132 that is based on the first and second data models. The second margin of error 132 may be determined by any series of statistical calculations that includes the computation of mean and standard deviation for the training and real-world data. The training data and/or live data and observations may be included in the first set of predictions 120.

The data analysis module 216 may use first set of predictions 118, the first margin of error 120, the second set of predictions 130, and the second margin of error to determine the quality of the predictability of the machine learning function. The quality of the predictability of the machine learning function 222 may be determined by any series of statistical calculations, such as Bayesian statistics, where an updated probability may be a factor of prior data, such as the first data model 114 and information or conditions related to the underlying data 122, after obtaining new data, such as a second set of attributes 126. The statistical model updates the probability calculation of the machine learning function 222 by including the first set of predictions 118, which is the prior data and the send set of predictions 130, the new data, into the statistical analysis.

That data analysis module 216 may engage a conditional probability analysis given the first set of results 118 and the second set of results 130. Given the two sets of probabilities, the conditional probability of the first set of predictions 118, given the second set of predictions 130 as true, is a function of the conditional probability of the second set of predictions 130 given that the first set of predictions 118 as true, multiplied to the fraction of the first set of predictions 118, divided by the second set of predictions 130. If the conditional probability of the first set of predictions 118 given the second set of predictions 130 is superior to the first set of predictions 118, then the inclusion of the second set of attributes 126 with the first data model 114 into the machine learning function 222 improves the predictability of the algorithms. The prediction analysis 134 may contain the results of the statistical analysis completed by the data analysis module 216.

The data output module 218 may generate a response data set 128 that is specific to the statistical analysis for the predictions of the first data model 116 and second data model 124. The response data set 128 may contain the second set of results 130 and the second margin of error 132, along prediction analysis 134 data. The response data set 128 is routed to the NOC, to be used as an evaluation tool for attributes.

The data store module 220 may store data that is used by the various modules of the data model engine 104. The data store module 220 may include one or more databases, such as relational databases, object databases, object-relational databases, and/or key-value databases. In various embodiments, the data store module 220 may store the attributes, underlying data, results of machine learning functions and statistical analyses.

Illustrative Operations

Figure 3:
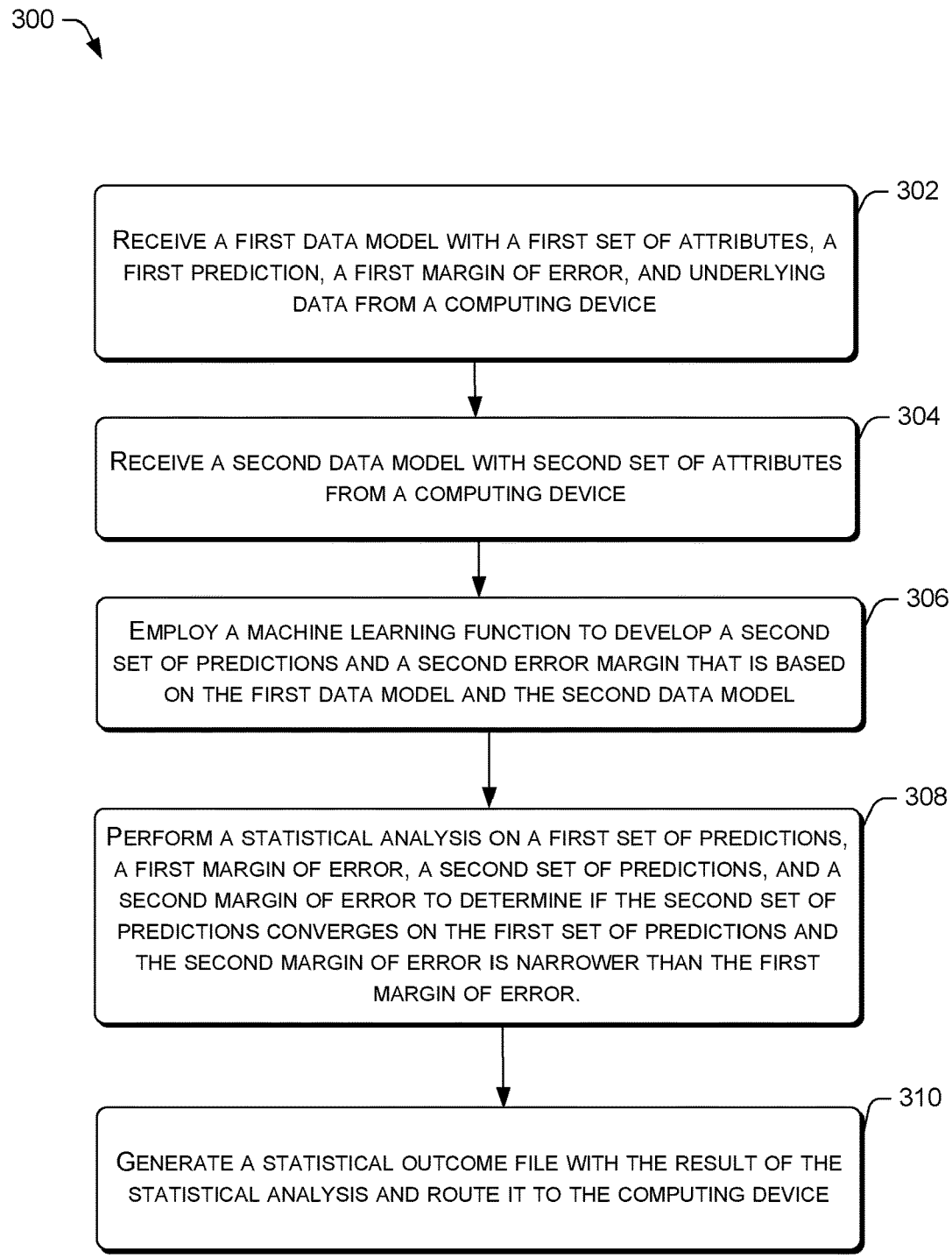
FIG. 3 is a flow diagram of an example process for the data source correlation techniques for machine learning and convolutional neural models.
Figure 4:
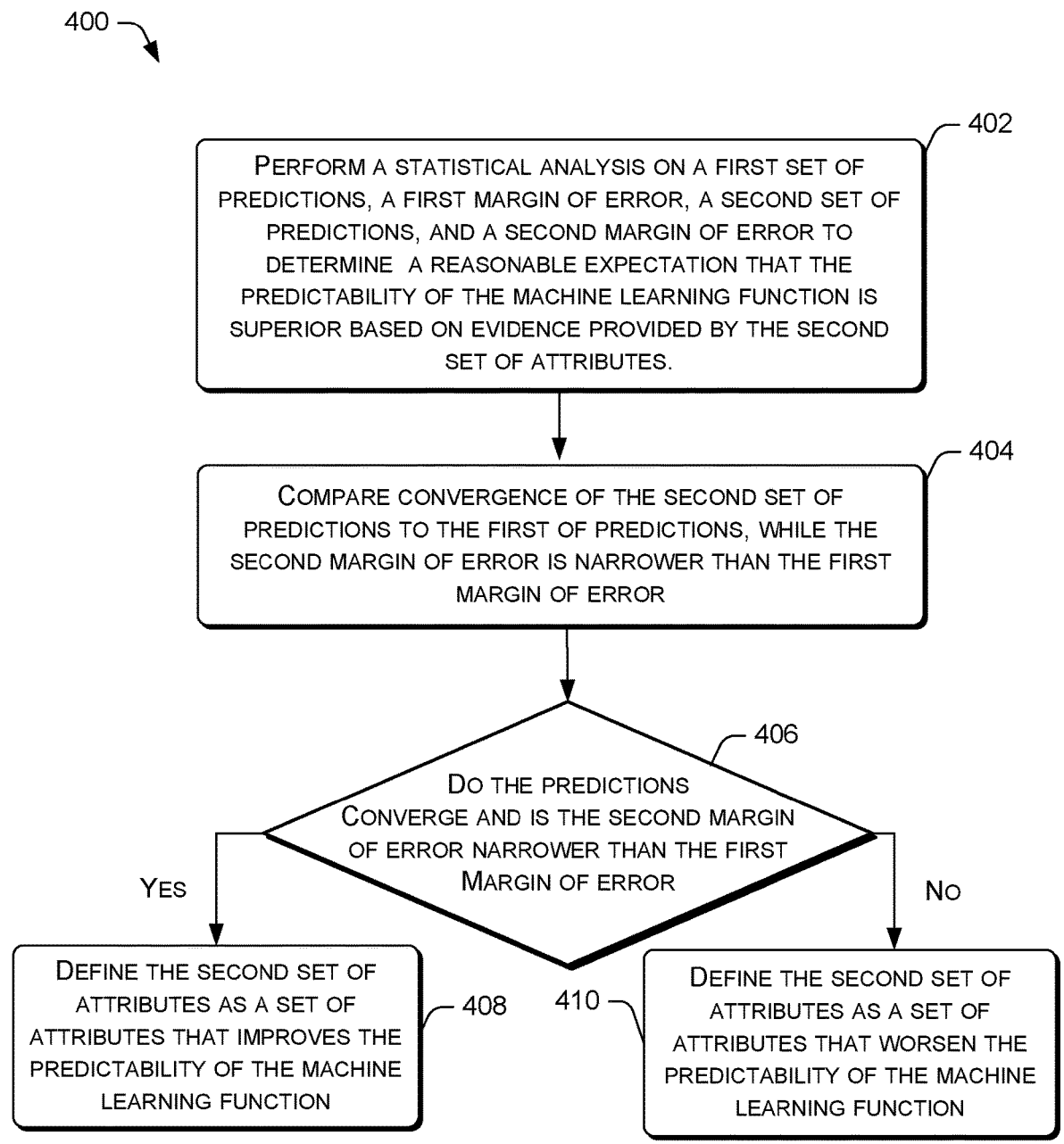
FIG. 4 is a flow diagram of an example process for determining a quality for the results of statistical analysis that is part of the data source correlation techniques for machine learning and convolutional neural models.

FIGS. 3-4 present illustrative processes 300-400 for implementing the data source correlation techniques for machine learning and convolutional neural models. Each of the processes 300-400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform functions or implement abstract data types. The order in which the operations are described is not intended to be construed as a limitation, and any number of the described blocks can be combined in any order and/or in parallel to implement the process. For discussion purposes, the processes 300-400 are described with reference to the machine learning and statistical analysis environment 100 of FIG. 1.

FIG. 3 is a flow diagram of an example process for implementing the data source correlation techniques for machine learning models and convolutional neural network models. At block 302, a data model computing device, via a network, may receive a first data model with a first set of attributes, a first prediction for the first data model and an associated margin of error, and underlying data.

At block 304, the data model computing device, via a network, may receive a second data model with a second set of attributes. The second set of attributes may be a set of test attributes for the machine learning function.

At block 306, the data model analysis engine, of the data model computing device, via a network, may employ a machine learning algorithm of a machine learning function to develop a second set of predictions and a second margin of error that are based on the first data model and the second data model.

At block 308, the data model analysis engine, of the data model computing device, may employ a statistical analysis predictions, the first margin of error, the second set of predictions and the second margin of error to establish that the inclusion of the second set of attributes with the first data model provides a reasonable expectation that the predictability of the machine learning function is superior to the predictability of the machine learning function without the inclusion of the second set of attributes.

At block 310, the data model computing device, generates and routes a statistical outcome file to the NOC. The statistical outcome file may include the statistical analysis result, the second set of results and the corresponding second margin of error.

FIG. 4 is a flow diagram of an example process 400 for determining a reasonable expectation that the predictability of the machine learning function algorithm is superior with the addition of a second data model to a first data model. At block 402 the data analysis engine performs a statistical analysis to determine a reasonable expectation that the predictability of the machine learning function is superior, based on the evidence provided by the second set of attributes.

At block 404, the data analysis engine may compare the convergence of the second set of predictions to the first set of predictions, while the second margin of error is narrower than the first margin of error. A second margin of error is superior to a first margin of error, when the second margin of error is narrower than the first margin of error.

At decision block 406, if the data model analysis engine establishes that the second set of predictions convergences on the first set of predictions, with a superior second margin of error ("yes" at decision block 404), the process 400 may proceed to block 408. If the data model analysis engine establishes that the second set of predictions diverges from the first set of predictions and/or the second margin of error is inferior to the first margin of error ("no" at decision block 404), the process 400 may proceed to block 410.

At block 408, the data model analysis engine labels the second set of attributes as attributes that improve the predictability of the machine learning function.

At block 410, the data model analysis engine labels the second set of attributes as attributes that worsen the predictability of the machine learning function.

CONCLUSION

Although the subject matter has been described in language specific to the structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable storage media, collectively storing computer-executable instructions that upon execution collectively cause one or more computers to perform acts comprising:
   receiving a first data model including a first set of attributes, an underlying data set, a first set of predictions, and a first margin of error associated with the first set of predictions;
   receiving a second data model with a second set of attributes;
   combining the first data model and second data model and applying a machine learning function to generate a second set of predictions and an associated second margin of error;
   performing a statistical analysis with the first set of predictions, the first margin of error, the second set of predictions and the second margin of error;
   distinguishing the second set of attributes from the first set of attributes when the second set of predictions converges to the first set of predictions and the second margin of error is narrower than the first margin of error; and
   merging the distinguished second set of attributes with the first set of attributes to produce predictions that have an improved quality with respect to the first set of predictions.

2. The one or more computer-readable storage media of claim 1, wherein the underlying data set or the first set of predictions include live data.

3. The one or more computer-readable storage media of claim 2, wherein the second set of attributes includes characteristics inherent to an object or an action that identify that object or action or assign a quality to the object or action.

4. The one or more computer-readable storage media of claim 1, wherein the margins of error include percentages of uncertainty for the set of predictions.

5. The one or more computer-readable storage media of claim 1, wherein the second data model combined with the first data model include test data for the predictability performance of the machine learning function.

6. The one or more computer-readable storage media of claim 1, wherein the second set of predictions and second set of margins of error include results of the first data model and second data model used as machine learning function input data.

7. The one or more computer-readable storage media of claim 1, wherein the statistical analysis includes Bayesian statistical analysis.

8. A system, comprising:
   one or more processors; and memory having instructions stored therein, the instructions, when executed by one or more processors, cause one or more computers to perform operations comprising:
   receiving a first data model including a first set of attributes, an underlying data set, a first set of predictions, and a first margin of error;
   receiving a second data model with a second set of attributes;
   combining the first data model and second data model and applying a machine learning function to generate a second set of predictions and an associated second margin of error;
   performing a statistical analysis with the first set of predictions, the first margin of error, the second set of predictions and the second margin of error;
   distinguishing the second set of attributes when the second set of predictions converges to the first set of predictions and the second margin of error is narrower than the first margin of error; and
   merging the distinguished second set of attributes with the first set of attributes to produce predictions that have an improved quality with respect to the first set of predictions.

9. The system of claim 8, wherein the underlying data set or the first set of predictions include live data.

10. The system of claim 8, wherein the second set of attributes comprise characteristics inherent to an object or an action that identifies that object or action or assigns a quality to the object or action.

11. The system of claim 8, wherein the margins of error comprise percentages of uncertainty for the set of predictions.

12. The system of claim 8, wherein the second data model and second set of attributes comprise test data for the predictability for the machine learning function.

13. The system of claim 8, wherein the second set of predictions and second set of margins of error comprise results of the first data model and second data model used as machine learning function input data.

14. The system of claim 8, wherein the statistical analysis comprises Bayesian statistical analysis.

15. A computer-implemented method, comprising:
   receiving a first data model including a first set of attributes, an underlying data set, a first set of predictions, and a first margin of error;
   receiving a second data model with a second set of attributes;
   combining the first data model and second data model and applying a machine learning function to generate a second set of predictions and an associated second margin of error;
   performing a statistical analysis with the first set of predictions, the first margin of error, the second set of predictions and the second margin of error;

distinguishing the second set of attributes when the second set of predictions converges to the first set of predictions and the second margin of error is narrower than the first margin of error; and merging the distinguished second set of attributes with the first set of attributes to produce predictions that have an improved quality with respect to the first set of predictions.

16. The computer-implemented method of claim 15, wherein the underlying data set or the first set of predictions include live data.

17. The computer-implemented method of claim 15, wherein the second set of attributes include characteristics inherent to an object or an action that identifies that object or action or assigns a quality to the object or action.

18. The computer-implemented method of claim 15, wherein the margins of error include percentages of uncertainty for the set of predictions.

19. The computer-implemented method of claim 15, wherein the second data model and second set of attributes include test data for the predictability for the machine learning function.

20. The computer-implemented method of claim 15, wherein the second set of predictions and second set of margins of error include the results of the first data model and second data model used as machine learning function input data.

* * * * *